June 13, 1950     E. V. SCHAAL     2,511,129
WINDSHIELD CLEANER
Filed April 2, 1945
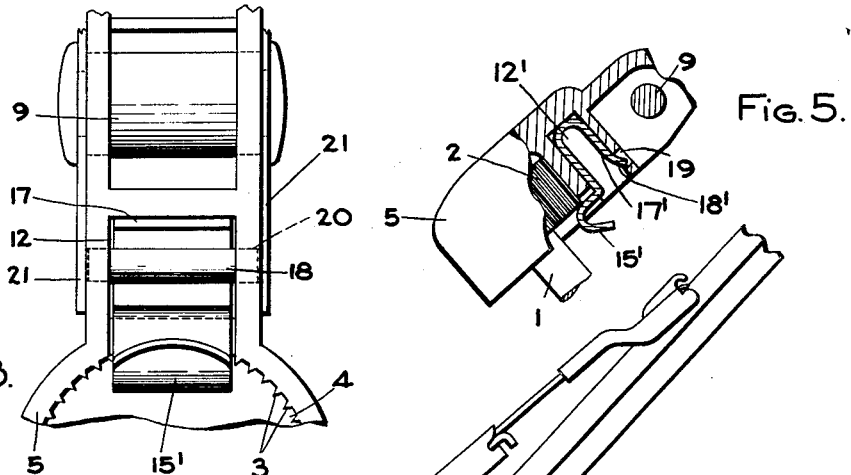
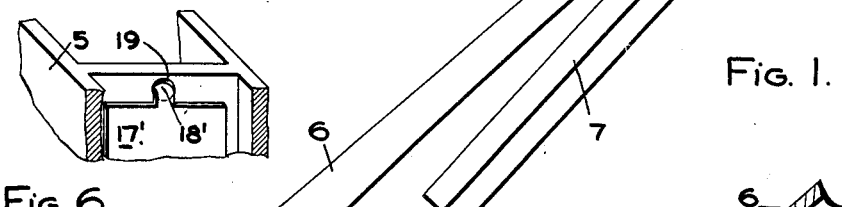
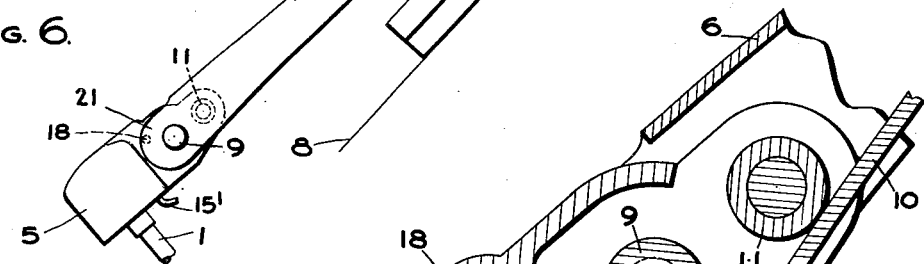
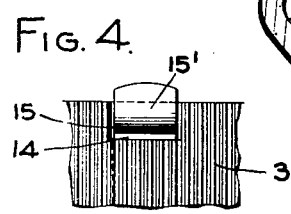
INVENTOR
EARL V. SCHAAL
BY
Bean, Brooks, Buckley & Bean. ATTORNEYS Patented June 13, 1950

2,511,129

UNITED STATES PATENT OFFICE 2,511,129

WINDSHIELD CLEANER

Earl V. Schaal, East Aurora, N. Y., assignor to Trico Products Corporation, Buffalo, N. Y.

Application April 2, 1945, Serial No. 586,117

10 Claims. (Cl. 287—53)

This invention relates to the windshield cleaner art and has particular reference to the mounting of the wiper actuating arm on its driving shaft. The modern windshield cleaner has an oscillating driving shaft provided with an enlarged head adapted to interlockingly fit within an arm socket for adjustment and thereby enable the path of the wiper being definitely and accurately located on the windshield to the best advantage. It has heretofore been proposed to provide a latch means on the arm for engaging behind the enlarged head for detachably securing the arm against accidental displacement or loss.

The object of the present invention is to provide an improved construction and arrangement of parts which is more durable and efficient in use and wholly practical in construction. Further, by this invention the several parts of the arm may be more economically assembled and therefore its manufacture greatly facilitated.

In the drawings:

Fig. 1 is a side elevation showing one embodiment of the invention as applied to a wiper mechanism;

Fig. 2 is an enlarged fragmentary view in longitudinal section through the wiper arm depicting the latter mounted on the shaft head.

Fig. 3 is a fragmentary rear elevation of the arm showing more particularly the location of the latch;

Fig. 4 is a fragmentary elevation from within the socket looking toward the latch;

Fig. 5 is a fragmentary elevation of another embodiment of the invention with parts in section; and Fig. 6 is a fragmentary perspective view thereof.

Referring more particularly to the drawings, the numeral 1 designates the oscillatory drive shaft of a cleaner mechanism having an enlarged head 2 which is peripherally fluted for interfitting engagement with the side ribs 3 formed in the side wall of the socket 4 of the wiper carrying arm. This arm is shown as comprising a mounting section 5 and a wiper carrying section 6, the latter supporting at its outer end a wiper 7 for back and forth movement on the windshield surface generally indicated at 8. The two arm sections 5 and 6 are pivotally connected by a pin 9, and a flat spring 10 on the outer section 6 reacts against a bearing 11 on the inner section 5 to urge the wiper firmly down upon the glass. All of this is of a well-known construction and provides a practical arrangement by which the wiper arm may be placed upon its actuating shaft 1 in the desired location so that the wiper will maintain a clear field of vision through a predetermined portion of the windshield. After determining the location of the path of the wiper, the arm is slid over the head of the shaft from the broken line position in Fig. 2 to the full line position where it is retained against accidental dislodgement by a practical latch means now to be described.

As shown in Figs. 2 and 3 the inner or mounting section 5 of the wiper carrying arm, which section is preferably die cast, is molded with a latch chamber 12. This chamber, together with the socket, open side by side through the rear face of the mounting section and are separated by a partitioned wall 13 which terminates short of such rear face to define a pocket 14 for the keeper 15 of a spring latch. The latch keeper is designed to normally overhang the rear edge of the shaft head 2, as shown clearly by the full lines in Fig. 2, and being disposed in the pocket 14 it is given lateral support which tends toward a durable structure. Furthermore by this arrangement the socket wall is uninterrupted throughout its inner periphery for greater strength of construction. The keeper 15 is carried on the outer end of a resilient arm 16 and therefore is free to yield clear of the shaft head 2, to the broken line position in Fig. 2, when mounting or demounting the arm.

A very practical and simple way of mounting this resilient arm is by shaping the latter with a return portion 17 imparting to the latch body a substantially U-form for frictionally fitting within the chamber 12. The flat spring of U-shape will firmly anchor the latch in place and in order to make this securement positive either a retaining pin 18 may be passed through the U-body or the return portion 17' may be provided with a tongue 18' for engaging in an aperture or recess 19 in the wall of the latch member 12' as shown in Figs. 5 and 6. The anchor pin 18 may be inserted through registering apertures 20 in the side walls of the chamber 12 and conveniently held against accidental displacement by the side ears 21 of the wiper carrying section 6 through which the pivot pin 9 passes. This arrangement serves to mount the retaining pin 18 without any special machine or tool operation, and by means of the U-formation of the spring latch its mounting is greatly simplified. The free edge 15' of the keeper affords a cam surface to facilitate the placement of the arm over the head 2. The structural simplicity of the present arm provides for economy in manufacture, and by reason of the novel latch mounting a durable and practical construction is obtained.

The foregoing particular description is for the purpose of clearness of disclosure and not by way of limitation since the inventive principles may assume other physical embodiments without departing from the spirit of the invention and the scope of the appended claims.

What is claimed is:

1. A wiper arm die cast with a shaft receiving socket and an adjacent latch containing chamber in one face divided by a partition wall, a latch disposed within the chamber and having a keeper part overhanging the wall of the socket for engaging a shoulder on an actuating shaft, the keeper part having a mounting shank in the form of a flat spring supported throughout its length by the wall, the inner end of the shank adjacent the bottom of the chamber being extended back upon itself in the form of a U to provide therewith an anchoring portion frictionally fitting in the bottom portion of the chamber, and means for positively securing the anchor portion against displacement from the chamber while leaving the mounting shank free to yield from said wall.

2. A wiper arm having a shaft receiving socket and an adjacent latch containing chamber opening side by side through one face thereof, and a spring latch having a keeper part overhanging the side wall of the socket for engaging an actuating shaft and a mounting shank of U-form, both legs of said mounting shank frictionally fitting against the opposing side wall portions of the chamber and yieldably supporting the keeper part, the side wall of the chamber having a recess receiving a part of the U-form to retain the latch against displacement from the chamber.

3. A wiper arm having a shaft receiving socket and an adjacent latch containing chamber opening side by side through one face thereof, a latch having a keeper part overhanging the side wall of the socket for engaging a shoulder on an actuating shaft and a supporting shank of flat spring stock shaped with a return bend to provide an anchoring portion frictionally fitting within the chamber, and an anchor pin disposed within the bight portion of the anchor portion and mounted in the wall of the chamber.

4. A wiper arm having a shaft receiving socket and a latch containing chamber opening side by side through a face thereof, the wall of the chamber remote from the socket having a recess therein and a latch having a spring shank with a keeper part, the shank having a return bend with a locking tongue detachably engaging in the wall recess to anchor the latch within the chamber, the partition wall which divides the chamber from the socket terminating short of the face of said arm to provide a pocket for guidingly receiving the keeper part in overhanging relation to the socket.

5. A wiper arm having a mounting section formed with a shaft receiving socket and an adjacent latch containing chamber opening through a face thereof, the chamber wall having a transverse aperture therein, a latch having a spring shank with a keeper part overhanging the side wall of the socket for engaging an actuating shaft, the inner end of the shank being given a return bend to form an anchoring portion within the chamber, a retaining pin removably mounted in the aperture in the chamber wall and disposed within the return bend of the shank to hold the latch in the chamber, and a wiper carrying section pivotally mounted on the mounting section and having a portion overlying the retaining pin to hold the latter against displacement from the aperture.

6. A wiper arm comprising a mounting section having a shaft receiving socket and a radially extending part, a wiper carrying section having spaced ears straddling the radial part, means pivotally connecting the ears to said part whereby the wiper carrying section may swing on the mounting section, said mounting section having a latch chamber between the socket and said pivot means provided with registering apertures in opposed side wall portions, a latch engaged in the chamber and having a keeper part for engaging a shaft within the socket, and a latch retaining pin interlocking with the latch to prevent the displacement of the latter and itself arranged within the registering apertures of the chamber wall portions and beneath the ears whereby the latter will serve to prevent dislodgment of the pin from the apertures.

7. A wiper arm having a shaft receiving socket and an adjacent latch containing chamber opening side by side through one face thereof, the side wall of the chamber having a recess therein, and a spring latch having a keeper part overhanging the side wall of the socket for engaging an actuating shaft and a mounting shank of U-form, the free end of the U-form having a tongue engaging the recess in the chamber wall to secure the latch in place.

8. A wiper arm having a shaft receiving socket and an adjacent latch chamber, and a spring latch having a substantially U-shaped mounting shank extending into the chamber with the opposed legs of the U-shank lying against opposed side wall portions of the chamber, one leg carrying a keeper at its outer end overhanging the side wall of the socket and the opposite leg carrying a retainer part, the chamber wall portion remote from the socket having a recess in which said retainer part engages to interlock the latch in place.

9. A wiper arm die cast with a shaft receiving socket and an adjacent latch containing chamber in one face divided by a partition wall, a latch disposed within the chamber and having a keeper part overhanging the wall of the socket for engaging a shoulder on an actuating shaft, the keeper part having a mounting shank in the form of a flat spring supported throughout its length by the wall, said shank having an anchoring portion extending outwardly within the chamber and resiliently bearing upon an opposed wall portion thereof for yieldably holding the shank in such supporting engagement with the partition wall.

10. A wiper arm die cast with a shaft receiving socket and an adjacent latch containing chamber in one face divided by a partition wall, a latch disposed within the chamber and having a keeper part overhanging the wall of the socket for engaging a shoulder on an actuating shaft, the keeper part having a mounting shank in the form of a flat spring supported throughout its length by the wall, said shank having an anchoring portion extending outwardly within the chamber and resiliently bearing upon an opposed wall portion thereof for yieldably holding the shank in such supporting engagement with the partition wall, said anchoring portion having a retaining part at its free end for interlocking engagement with the opposed wall portion to secure the latch against displacement from the chamber while leaving the mounting shank free to yield from said partition wall.

EARL V. SCHAAL.

REFERENCES CITED

The following references are of record in the file of this patent:

UNITED STATES PATENTS

| Number | Name | Date |
|---|---|---|
| 1,085,543 | Collins | Jan. 27, 1914 |
| 2,154,537 | Stenberg | Apr. 18, 1939 |
| 2,252,855 | Lasch | Aug. 19, 1941 |
| 2,286,035 | Horton et al. | June 9, 1942 |